United States Patent
Kardos et al.

(10) Patent No.: US 7,617,679 B2
(45) Date of Patent: Nov. 17, 2009

(54) ARRANGEMENT FOR RECIRCULATION OF EXHAUST GASES OF A SUPER-CHARGED INTERNAL COMBUSTION ENGINE

(75) Inventors: Zoltan Kardos, Södertälje (SE); Pehr Söderberg, Södertälje (SE); Erik Söderberg, Stockholm (SE); Hans Wikstrom, Johanneshov (SE); Rickard Pettersson, Rönninge (SE); Roland Ivarsson, Nykvarn (SE)

(73) Assignee: Scania CV AB (publ) (SE)

( * ) Notice: Subject to any disclaimer, the term of this patent is extended or adjusted under 35 U.S.C. 154(b) by 74 days.

(21) Appl. No.: 11/569,728

(22) PCT Filed: May 24, 2005

(86) PCT No.: PCT/SE2005/000764

§ 371 (c)(1),
(2), (4) Date: Nov. 28, 2006

(87) PCT Pub. No.: WO2005/116437

PCT Pub. Date: Dec. 8, 2005

(65) Prior Publication Data

US 2008/0047267 A1    Feb. 28, 2008

(30) Foreign Application Priority Data

May 28, 2004 (SE) .................................. 0401376

(51) Int. Cl.
*F02B 33/44* (2006.01)
*F02B 29/04* (2006.01)
*F02B 33/00* (2006.01)
*F02M 25/07* (2006.01)

(52) U.S. Cl. ...................... 60/605.2; 60/599; 123/563; 123/568.12

(58) Field of Classification Search ................ 60/605.2, 60/599; 123/563, 568.12; *F02M 25/07; F02B 29/04*
See application file for complete search history.

(56) References Cited

U.S. PATENT DOCUMENTS 4,317,439 A * 3/1982 Emmerling .................. 60/599

(Continued)

FOREIGN PATENT DOCUMENTS

DE    4240239 A1 * 6/1994

(Continued)

OTHER PUBLICATIONS

International Search Report PCT/SE2005/000764 dated Jul. 7, 2005 (Swedish Patent Office).

*Primary Examiner*—Thai Ba Trieu
(74) *Attorney, Agent, or Firm*—Ostrolenk Faber LLP

(57) ABSTRACT

An arrangement for recirculation of exhaust gases of a super-charged combustion engine. A return line which connects an engine exhaust line to an air inlet line for air supply to the combustion engine, to recirculate exhaust gases via the return line. A first EGR cooler in which the recirculating exhaust gases in the return line are cooled, as a first step, by a first coolant in a first cooling system. A second EGR cooler in which the recirculating exhaust gases in the return line are cooled, as a second step, by a second coolant in a second cooling system, and the second coolant is adapted to be at a temperature substantially corresponding to the temperature of the ambient surroundings when it is led into the second EGR cooler. A charge air cooler for the inlet line, a radiator for the second cooling system to cool the exhaust gases and a radiator element for cooling the second coolant.

23 Claims, 2 Drawing Sheets

U.S. PATENT DOCUMENTS

| | | | | |
|---|---|---|---|---|
| 4,961,404 A | * | 10/1990 | Itakura et al. | 123/563 |
| 5,607,010 A | | 3/1997 | Schönfeld et al. | 60/605.2 |
| 6,244,256 B1 | * | 6/2001 | Wall et al. | 60/605.2 |
| 6,789,512 B2 | * | 9/2004 | Duvinage et al. | 123/568.12 |
| 6,883,314 B2 | * | 4/2005 | Callas et al. | 60/599 |
| 7,059,308 B2 | * | 6/2006 | Eitel et al. | 123/568.12 |
| 7,254,947 B2 | * | 8/2007 | Burk et al. | 60/599 |
| 7,267,086 B2 | * | 9/2007 | Allen et al. | 123/568.12 |
| 7,310,946 B2 | * | 12/2007 | Rogg et al. | 60/599 |
| 2003/0033993 A1 | * | 2/2003 | Valaszkai et al. | 60/599 |
| 2006/0185364 A1 | * | 8/2006 | Chalgren et al. | 60/599 |
| 2006/0225417 A1 | * | 10/2006 | Pantow et al. | 60/599 |
| 2007/0199317 A1 | * | 8/2007 | Pelz et al. | 60/605.2 |
| 2007/0204614 A1 | * | 9/2007 | Kolb | 60/599 |
| 2007/0204619 A1 | * | 9/2007 | Pelz et al. | 60/605.2 |
| 2007/0245716 A1 | * | 10/2007 | Kardos et al. | 60/278 |
| 2008/0047533 A1 | * | 2/2008 | Kardos | 60/599 |
| 2008/0256949 A1 | * | 10/2008 | Wikstrom et al. | 60/605.2 |

FOREIGN PATENT DOCUMENTS

| | | | |
|---|---|---|---|
| EP | 1 091 113 A2 | | 4/2001 |
| JP | 2005127137 A | * | 5/2005 |
| JP | 2007092715 A | * | 4/2007 |
| KR | 2002-000066 A | * | 2/2002 |
| WO | WO 2004044401 A1 | * | 5/2004 |
| WO | WO 2004/051069 A1 | | 6/2004 |
| WO | WO 2005073535 A1 | * | 8/2005 |
| WO | WO 2008069743 A1 | * | 6/2008 |

* cited by examiner

ARRANGEMENT FOR RECIRCULATION OF EXHAUST GASES OF A SUPER-CHARGED INTERNAL COMBUSTION ENGINE

CROSS REFERENCE TO RELATED APPLICATION

The present application is a 35 U.S.C. 371 national phase conversion of PCT/SE2005/000764, filed 24 May 2005, which claims priority of Swedish Application No. 0401376-9, filed 28 May 2005. The PCT International Application was published in the English language.

BACKGROUND TO THE INVENTION, AND STATE OF THE ART

The present invention relates to an arrangement for recirculation of exhaust gases of a supercharged combustion engine, without making the performance of the inferior due to the recirculated gases.

The technique known as EGR (Exhaust Gas Recirculation) is a known way of leading part of the exhaust gases from a combustion process in a combustion engine back, via a return line, to an inlet line for supply of air to the combustion engine. A mixture of air and exhaust gases is thus supplied via the inlet line to the engine's cylinders in which the combustion takes place. The addition of exhaust gases to the air causes a lower combustion temperature resulting inter alia in a reduced content of nitrogen oxides $NO_x$ in the exhaust gases. This technique is applied in both Otto engines and diesel engines.

The amount of air which can be supplied to a supercharged combustion engine depends on the pressure of the air but also on the temperature of the air. Supplying the largest possible amount of air to the combustion engine therefore entails cooling the compressed air in a charge air cooler before it is led to the combustion engine. The compressed air is cooled in the charge air cooler by ambient air flowing through the charge air cooler. The compressed air can thus be cooled to a temperature which is only a few degrees above the temperature of the surroundings. In cases where EGR technology is used, the returned exhaust gases also need cooling. This is achieved by means of a so-called EGR cooler. An EGR cooler is usually connected to the combustion engine's cooling system so that the exhaust gases are cooled in the EGR cooler by the circulating coolant in the cooling system. The EGR cooler is thus subject to the limitation that the exhaust gases cannot be cooled to a lower temperature than the temperature of the coolant in the cooling system. The cooled exhaust gases are therefore usually at a higher temperature than the cooled compressed air when they are put into the inlet line to the combustion engine. The mixture of exhaust gases and air being led to the combustion engine will therefore be at a higher temperature than the compressed air led into a supercharged combustion engine which is not provided with recirculation of exhaust gases. The performance of a supercharged combustion engine equipped with EGR is therefore somewhat inferior to that of a supercharged combustion engine not equipped with EGR.

SUMMARY OF THE INVENTION

The object of the invention is to provide an arrangement which effects recirculation of exhaust gases in a supercharged combustion engine in such a way that the recirculation of exhaust gases does not result in the combustion engine's performance being inferior to that of a similar combustion engine not provided with recirculation of exhaust gases.

This object is achieved with the arrangement of the kind mentioned in the introduction by the features of the invention. By means of the arrangement, the exhaust gases are subjected to cooling in two steps. In the first step, the exhaust gases are cooled by the coolant in the combustion engine's cooling system. The exhaust gases are thus subjected to their main cooling, which cools them from a temperature of about 600-700° C. to a temperature of about 100° C. Thereafter the exhaust gases are cooled in a second step by the second coolant in the second cooling system from about 100° C. down to a temperature close to the temperature of the surroundings. As the temperature drop in the second step is significantly smaller than the temperature drop in the first step, the second cooling system may provide a relatively slight cooling effect. The second cooling system can therefore be given small dimensions so that it can be applied in small trucks and in large trucks in which there is limited space. As the inlet temperature of the second coolant corresponds to the temperature of the surroundings when it is led into the second EGR cooler, it can provide cooling of the exhaust gases to a temperature which exceeds the temperature of the surroundings by only a few degrees. Thus the recirculating exhaust gases after cooling in the EGR coolers, and the compressed air after cooling in a charge air cooler which is cooled by ambient air, are provided with a substantially similar temperature. The recirculating exhaust gases therefore impart to the compressed air substantially no temperature rise when they are put into the inlet line. The mixture of exhaust gases and compressed air can thus be given a temperature corresponding to that of the compressed air which is supplied to a combustion engine not equipped with recirculation of exhaust gases. A combustion engine with an arrangement according to the present invention can therefore present performance substantially corresponding to that of a combustion engine not equipped with EGR.

According to a preferred embodiment of the present invention, the first EGR cooler and the second EGR cooler constitute a composite unit. Such a composite EGR cooler unit can be made more compact and hence occupy less space than two separate EGR coolers. In such cases the exhaust gases are cooled in the composite EGR cooler unit initially by the coolant in the first cooling system and thereafter by the coolant in the second cooling system. After passing through the composite EGR cooler, the exhaust gases will have cooled to a temperature just above the temperature of the surroundings. The second cooling system may comprise a coolant pump by which the coolant is circulated through the cooling system. There is thus assurance that the coolant in the second cooling system is subjected to well-controlled circulation in the cooling system. The second cooling system may comprise a radiator element for cooling the circulating coolant, said radiator element being fitted in a region through which ambient air flows. The combustion engine is used with advantage for powering a vehicle. By suitable positioning of the radiator element in such cases it is possible to achieve a natural flow of ambient air through the radiator element during operation of the vehicle. Alternatively, the second cooling system may comprise a radiator fan by which ambient air is caused to flow through the radiator element.

According to another preferred embodiment of the invention, the arrangement comprises a charge air cooler adapted to cooling the compressed air in the inlet line to the combustion engine. Such a charge air cooler is usually fitted in a vehicle forward of the ordinary radiator in which the coolant which is intended to cool the combustion engine is cooled. The compressed air in the charge air cooler is therefore cooled by ambient air flowing through the charge air cooler. The radiator element and the charge air cooler may be fitted in separate regions through which ambient air flows. Thus the second cooling system may comprise a separate radiator fan which circulates ambient air through the radiator element. Alternatively, the radiator element and the charge air cooler may be fitted in a common region. In such cases a common radiator fan may be used for circulating ambient air through both the charge air cooler and the radiator element.

According to another preferred embodiment of the invention, the radiator element and the charge air cooler substantially comprise flat cooling packages which each have a main extent in one plane, whereby the radiator element and the charge air cooler are fitted in a substantially common plane in the common region. With advantage, the radiator element and the charge air cooler are fitted alongside one another in a substantially common plane which is substantially perpendicular to the direction of flow of the air. In such cases the air led through said common region will be led in parallel through the radiator element and the charge air cooler. This air will thus only pass through the radiator element or through the charge air cooler. There is thus assurance that air at the temperature of the surroundings flows through the radiator element and the charge air cooler. The compressed air in the charge air cooler and the coolant in the radiator element which is intended to cool the exhaust gases in the EGR cooler thus provide a substantially similar temperature. A radiator belonging to the first cooling system may also be fitted in said common region at a location downstream from the radiator element and the charge air cooler in the direction of flow of the air. The vehicle's existing radiator fan may therefore also be used for leading air through the charge air cooler and the radiator element. In such cases the air will be led first through the radiator element or the charge air cooler before being led through the radiator belonging to the first cooling system. However, the air led through the cooler thereby acquires a somewhat higher temperature than the surroundings. The coolant in the first cooling system, which cools the combustion engine, need nevertheless not be cooled down to the temperature of the surroundings in order to perform an acceptable function.

BRIEF DESCRIPTION OF THE DRAWINGS

Preferred embodiments of the invention are described below by way of examples with reference to the attached drawings, in which.

DETAILED DESCRIPTION OF PREFERRED EMBODIMENTS OF THE INVENTION

Figure 1:
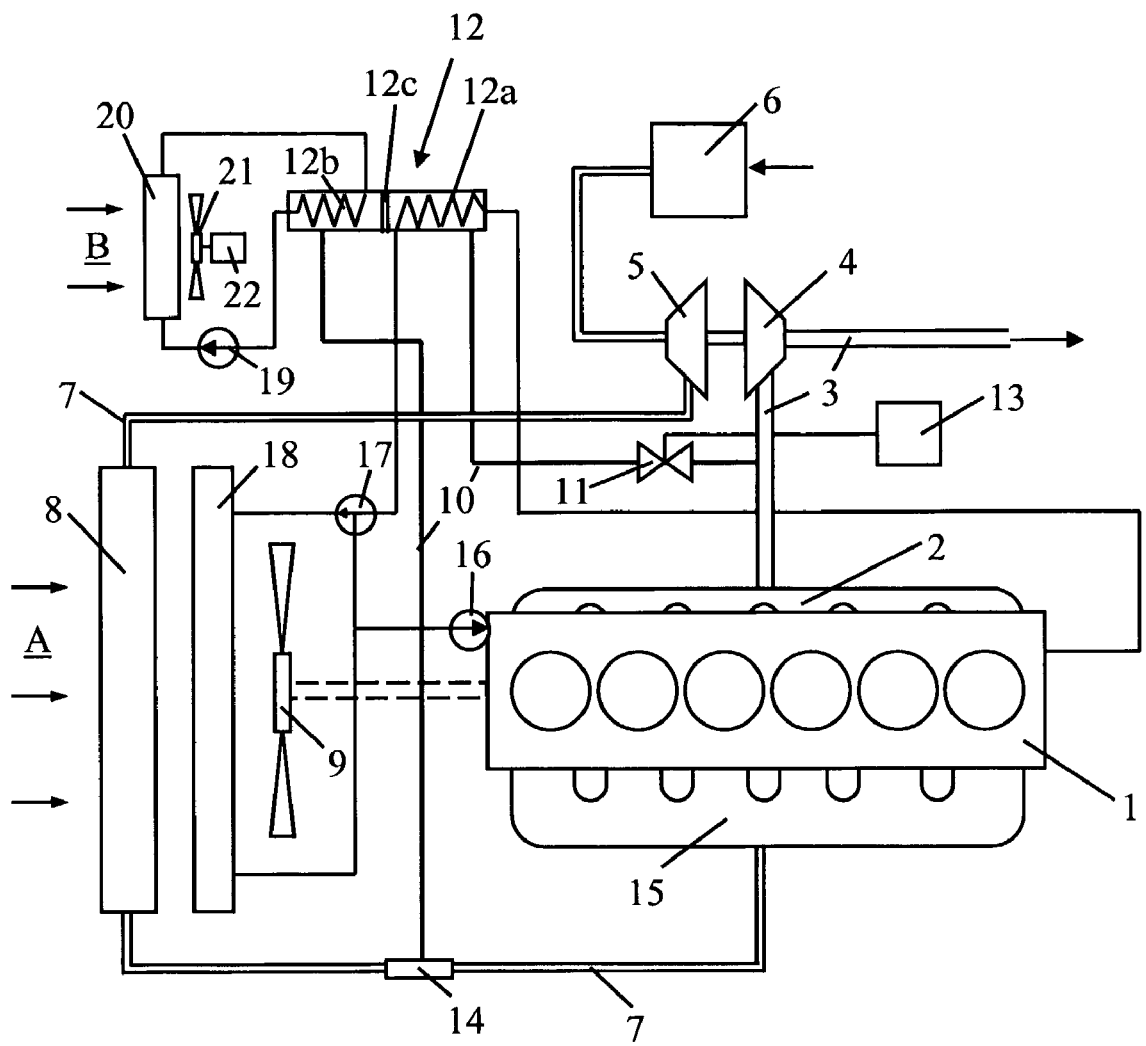
FIG. 1 depicts an arrangement, according to a first embodiment of the invention, for recirculation of exhaust gases in a supercharged diesel engine

FIG. 1 depicts an arrangement for recirculation of exhaust gases of a supercharged combustion engine. The combustion engine is in this case a diesel engine 1. Such recirculation is usually called EGR (Exhaust Gas Recirculation). Adding exhaust gases to the compressed air which is led to the engine's cylinders lowers the combustion temperature and hence also the content of nitrogen oxides ($NO_x$) which are formed during the combustion processes. The diesel engine 1 may be intended to power a heavy vehicle. The exhaust gases from the cylinders of the diesel engine 1 are led via an exhaust manifold 2 to an exhaust line 3. The exhaust gases in the exhaust line 3, which are at above atmospheric pressure, are led to a turbine 4. The turbine 4 is thus provided with driving power which is transmitted, via a connection, to a compressor 5. The compressor 5 compresses air which is led into the inlet line 7 via an air filter 6. A charge air cooler 8 is arranged in the inlet line 7. The purpose of the charge cooler 8 is to cool the compressed air before it is led to the diesel engine 1. The compressed air is cooled in the charge air cooler 8 by ambient air which flows through the charge air cooler 8 from a radiator fan 9. The radiator fan 9 is driven by the diesel engine 1 via a suitable connection.

An arrangement for effecting recirculation of part of the exhaust gases in the exhaust line 3 comprises a return line 10 which extends between the exhaust line 3 and the inlet line 7. The return line 10 comprises an EGR valve 11 by which the exhaust flow in the return line 10 can be shut off as necessary. The EGR valve 11 may also be used for controlling the amount of exhaust gases led from the exhaust line 3 to the inlet line 7 via the return line 10. A control unit 13 is adapted to controlling the EGR valve 11 on the basis of information about the current operating state of the diesel engine 1. The control unit 13 may be a computer unit provided with suitable software. The return line 10 also comprises a composite EGR cooler 12 which comprises a first portion 12a and a second portion 12b which are separated by an internal wall 12c. In supercharged diesel engines 1, the pressure of the exhaust gases in the exhaust line 3 in certain operating situations is lower than the pressure of the compressed air in the inlet line 7. In such situations it is not possible to mix the exhaust gases in the return line 10 directly with the compressed air in the inlet line 7 without special auxiliary means. To this end it is possible to use, for example, a venturi 14. If the combustion engine is instead a supercharged Otto engine, the exhaust gases in the return line 10 can be led directly into the inlet line 7, since the exhaust gases in the exhaust line 3 of an Otto engine in substantially all operating situations will be at a higher pressure than the compressed air in the inlet line 7. When the exhaust gases have been mixed with the compressed air in the inlet line 7, the mixture is led via a manifold 15 to the respective cylinders of the diesel engine 1.

The diesel engine 1 is cooled in a conventional way by a first cooling system. The exhaust gases in the first portion 12a of the composite EGR cooler are cooled by the first cooling system. The first cooling system comprises a circuit with a coolant which is circulated by a first coolant pump 16. The circuit also comprises a thermostat 17 and a radiator 18 which is fitted in a first region A through which ambient air flows. A radiator fan 9 is intended to lead ambient air in the first region A through the radiator 18 and the charge air cooler 8. The exhaust gases in the second portion 12b of the composite EGR cooler are cooled by a second cooling system. The second cooling system likewise comprises a circuit with a circulating coolant. The coolant is circulated in the circuit by means of a second coolant pump 19. The cooling system also comprises a radiator element 20 fitted in a second region B through which ambient air flows from a second radiator fan 21. The second radiator fan 21 is driven by an electric motor 22.

During operation of the diesel engine 1, the exhaust gases in the exhaust line 3 drive a turbine 4 before they are led out to the surroundings. The turbine 4 is thus provided with driving power which drives a compressor 5. The compressor 5 compresses air which is led into the inlet line 7 via the air filter 6. The compressed air is cooled in the charge air cooler 8 by ambient air flowing through the charge air cooler 8. The compressed air in the charge air cooler 8 is thus cooled to a temperature which exceeds the temperature of the surroundings by only a few degrees. In most operating states of the diesel engine 1, the control unit 13 keeps the EGR valve 11 open so that part of the exhaust gases in the exhaust line 3 is led into the return line 10. The exhaust gases in the exhaust line 3 are usually at a temperature of about 600-700° C. When the exhaust gases in the return line 10 are led into the first portion 12a of the composite EGR cooler, they undergo cooling by the first cooling system. Here the exhaust gases are cooled by the coolant in the first cooling system. The exhaust gases are subjected here to their main temperature reduction. The first cooling system is subject, however, to the limitation that it can at best cool the exhaust gases to a temperature corresponding to the temperature of the coolant. The temperature of the coolant in the cooling system may vary but in normal operation is usually within the range 80-100° C. The amount of compressed air and exhaust gases which can be supplied to the diesel engine 1 depends on the pressure of the air and the exhaust gases but also on the latter's temperature. It is therefore important to provide further cooling of the recirculating exhaust gases. The exhaust gases are therefore led via an aperture in the internal wall 12c into the second portion 12b of the composite EGR cooler 12, in which the exhaust gases are cooled by the second coolant in the second cooling system. The second coolant is cooled by ambient air in the radiator element 20. By suitable dimensioning of the radiator element 20 it is possible in such cases for the second coolant to be cooled to a temperature substantially corresponding to the temperature of the surroundings. Alternatively, the coolant flow in the second cooling system may be regulated so that the coolant is cooled to a temperature substantially corresponding to the temperature of the surroundings after passing through the radiator element 20. To achieve such cooling of the coolant, the flow through the radiator element 20 needs to be relatively small. Thus the second coolant can also cool the exhaust gases in the second portion 12b of the composite EGR cooler 12 to a temperature substantially corresponding to the temperature of the surroundings.

In supercharged diesel engines 1 in certain operating situations the pressure of the exhaust gases in the exhaust line 3 will thus be lower than the pressure of the compressed air in the inlet line 7. The venturi 14 can be used to reduce the static pressure of the air in the inlet line 7 locally, at the connection to the return line 10, so that the exhaust gases can be led into and mixed with the compressed air in the inlet line 7. The mixture of exhaust gases and compressed air is thereafter led via the manifold 15 to the respective cylinders of the diesel engine 1. A diesel engine 1 equipped with EGR can, by such cooling of the recirculating exhaust gases in the EGR cooler 12, provide the recirculating exhaust gases with a temperature which substantially corresponds to the temperature of the compressed air after cooling in the charge air cooler 8. The mixture of exhaust gases and compressed air led to the diesel engine 1 is thus provided with a temperature substantially corresponding to the temperature of the compressed air led to a diesel engine without EGR. With the present invention, a diesel engine equipped with EGR can therefore present performance substantially corresponding to that of a diesel engine not equipped with EGR.

Figure 2:
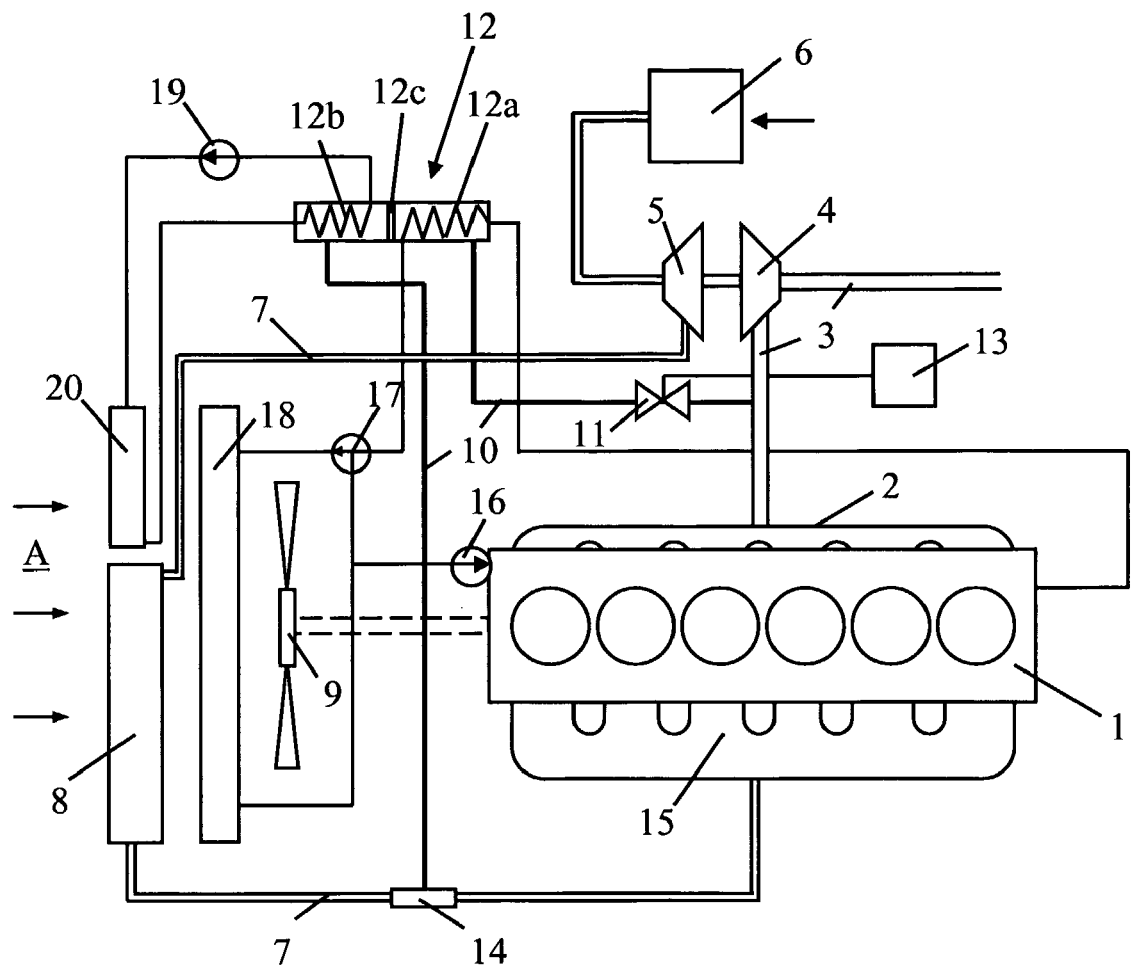
FIG. 2 depicts an arrangement, according to a second embodiment of the invention, for recirculation of exhaust gases in a supercharged diesel engine.

FIG. 2 depicts an alternative arrangement for recirculation of exhaust gases. In this case the radiator element 20 belonging to the second cooling system is situated in the same region A through which air flows as the charge air cooler 8 and the radiator 18. The first radiator fan 9 can therefore also be used for leading air through the radiator element 20. In this case there is thus no need to use a second radiator fan 21. The radiator element 20 and the charge air cooler 8 substantially comprise flat cooling packages which each have a main extent in one plane. In this case the radiator element 20 and the charge air cooler 8 are fitted alongside one another in a substantially common plane which is substantially perpendicular to the direction of flow of the air in the first region A. The air is here led in parallel through the radiator element 20 and the charge air cooler 8. There is thus assurance that air at the temperature of the surroundings flows through both the radiator element 20 and the charge air cooler 8. The compressed air in the charge air cooler 8 and the coolant in the radiator element 20 are thus subjected to cooling to a temperature substantially corresponding to the temperature of the surroundings. In this case the radiator 18 belonging to the first cooling system is fitted at a location downstream from the radiator element 20 and the charge air cooler 8 in the direction of flow of the air. The air is thus led first through the radiator element 20 or the charge air cooler 8 before it is led through the radiator 18. The air reaching the radiator 18 will thus be at a somewhat higher temperature than the surroundings. However, this air is at a temperature which is usually perfectly sufficient for cooling the coolant in the radiator 18 when there is no need for the coolant in the radiator 18 to be cooled down to the temperature of the surroundings.

The invention is in no way limited to the embodiments illustrated in the drawings but may be varied freely within the scopes of the claims.

The invention claimed is:

1. An exhaust gases cooler of a supercharged combustion engine fed by compressed air led from an outside inlet line to the supercharged combustion engine, the compressed air having a first temperature and the exhaust gases cooler being operable to cool exhaust gases by means of a first coolant cooled by an engine coolant radiator that cools engine coolant and by means of a second coolant cooled by a secondary radiator positioned apart from the engine coolant radiator, the exhaust gases cooler comprising:

a first EGR cooler operable, as a first cooling step, to cool the exhaust gases by means of the first coolant; and a second cooling system comprising a second EGR cooler operable, as a second cooling step, to cool the exhaust gases by means of the second coolant, the second cooling system being operable to cool the second coolant to cool the exhaust gases to a second temperature, the second temperature being substantially the same as the first temperature of the compressed air led to the supercharged combustion engine.

2. The exhaust gases cooler of claim 1, wherein the second cooling system comprises the secondary radiator element.

3. The exhaust gases cooler of claim 2, further comprising a radiator fan positioned and operable to cause ambient air to flow through the secondary radiator element, the radiator fan being additional to a combustion engine radiator fan.

4. The exhaust gases cooler of claim 2, wherein the secondary radiator element is positioned adjacent a charge air cooler for cooling air fed to the supercharged combustion engine.

5. The exhaust gases cooler of claim 4, wherein the secondary radiator element comprises a flat cooling package having a main extent in one plane, and the secondary radiator element is positioned such that the secondary radiator element and the charge air cooler both lie in the one plane.

6. An arrangement for recirculation of exhaust gases of a supercharged combustion engine and for cooling the exhaust gases by a first coolant cooled by an engine coolant radiator that cools engine coolant and by a second coolant cooled by a secondary radiator element positioned apart from the engine coolant radiator, wherein the arrangement comprises:

an exhaust line from the engine operable to lead the exhaust gases out from the combustion engine;

an inlet line leading from outside of the arrangement to the engine and operable to lead, as a compressed air, air at above atmospheric pressure to the combustion engine;

a charge air cooler positioned and operable to cool the compressed air in the inlet line to a first temperature;

a return line connecting the exhaust line to the inlet line, and the return line is operable to recirculate the exhaust gases from the exhaust line to the inlet line;

a first cooling system comprising a first EGR cooler operable, as a first cooling step, to cool the exhaust gases in the return line by the first coolant; and a second cooling system comprising the secondary radiator element, the secondary radiator element and the charge air cooler being positioned in separate regions of the engine, each of the separate regions being exposed to an ambient air flowing through the separate regions, the second cooling system further comprising a second EGR cooler operable, as a second cooling step, to cool the exhaust gases in the return line by the second coolant, and the second cooling system being operable to cool the second coolant to cool the exhaust gases in the return line to a second temperature, the second temperature being substantially the same as the first temperature of the compressed air led to the combustion engine.

7. An arrangement according to claim 6, wherein the first EGR cooler and the second EGR cooler together constitute a composite unit.

8. An arrangement according to claim 7, wherein the second cooling system further comprises a coolant pump operable to circulate the second coolant through the second cooling system.

9. An arrangement according to claim 8, wherein the secondary radiator element operable to cool the second coolant is positioned in a region of the engine through which ambient air flows.

10. An arrangement according to claim 8, wherein the second cooling system further comprises a radiator fan positioned and operable to cause ambient air to flow though the secondary radiator element, the radiator fan being additional to a combustion engine radiator fan.

11. An arrangement according to claim 7, wherein the secondary radiator element operable to cool the second coolant is positioned in a region of the engine through which ambient air flows.

12. An arrangement according to claim 11, wherein the second cooling system further comprises a radiator fan positioned and operable to cause ambient air to flow though the secondary radiator element, the radiator fan being additional to a combustion engine radiator fan.

13. An arrangement according to claim 11, further comprising a charge air cooler positioned and operable to cool the compressed air in the inlet line to the combustion engine.

14. An arrangement according to claim 13, wherein the secondary radiator element and the charge air cooler are positioned in separate regions of the engine through which ambient air flows.

15. An arrangement according to claim 13, wherein the secondary radiator element is positioned adjacent to the charge air cooler.

16. An arrangement according to claim 15, wherein the secondary radiator element and the charge air cooler each comprises a flat cooling package having a main extent in one plane, and the secondary radiator element and the charge air cooler are positioned in the one plane.

17. An arrangement according to claim 16, wherein the first cooling system comprises the engine coolant radiator positioned adjacent the secondary radiator element or the charge air cooler and downstream from the secondary radiator element and from the charge air cooler with respect to a direction of flow of air.

18. An arrangement according to claim 6, wherein the second cooling system further comprises a coolant pump operable to circulate the second coolant through the second cooling system.

19. An arrangement according to claim 18, wherein the secondary radiator element operable to cool the second coolant is positioned in a region of the engine through which ambient air flows.

20. An arrangement according to claim 6, wherein the secondary radiator element is positioned adjacent to the charge air cooler.

21. An arrangement according to claim 20, wherein the secondary radiator element and the charge air cooler each comprises a flat cooling package having a main extent in one plane, and the secondary radiator element and the charge air cooler are positioned in the one plane.

22. An arrangement according to claim 21, wherein the first cooling system comprises the engine coolant radiator positioned adjacent the secondary radiator element or the charge air cooler and downstream from the secondary radiator element and the charge air cooler with respect to a direction of flow of air.

23. An arrangement according to claim 20, wherein the combustion engine radiator fan is positioned and operable to cause ambient air to flow though the secondary radiator element and the charge air cooler.

* * * * *